C. J. MALLETT.
RAKE.
APPLICATION FILED JULY 7, 1914.
1,154,790.
Patented Sept. 28, 1915.
2 SHEETS—SHEET 2.
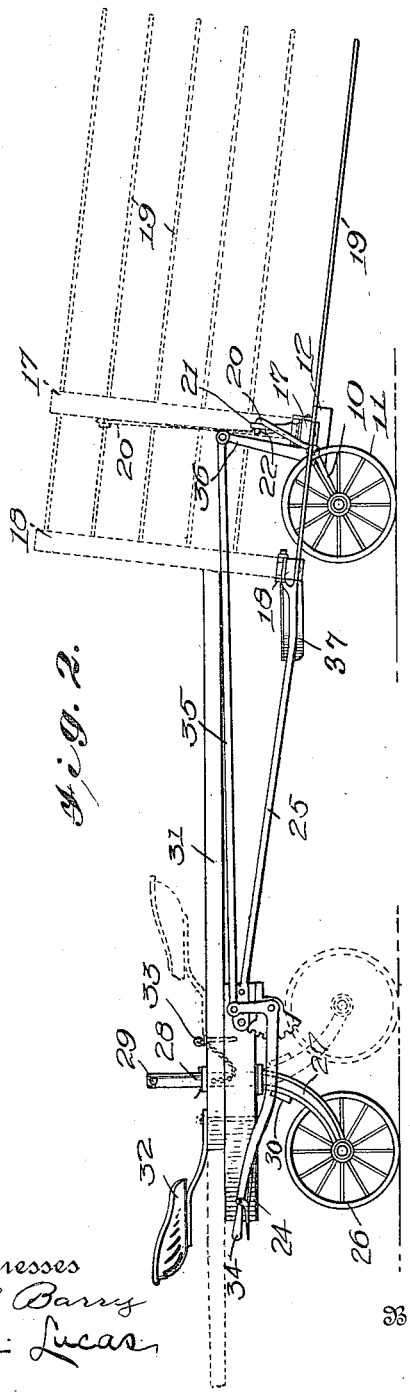
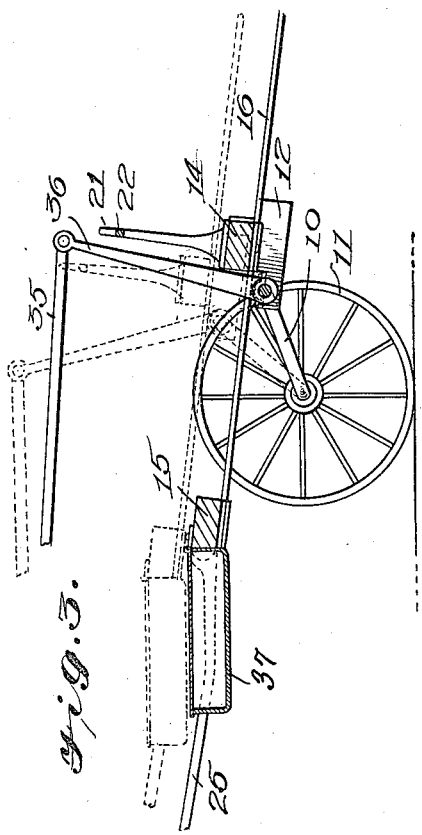
Witnesses
F. C. Barry
M. C. Lucas
Inventor
Charles J. Mallett
By
Attorneys

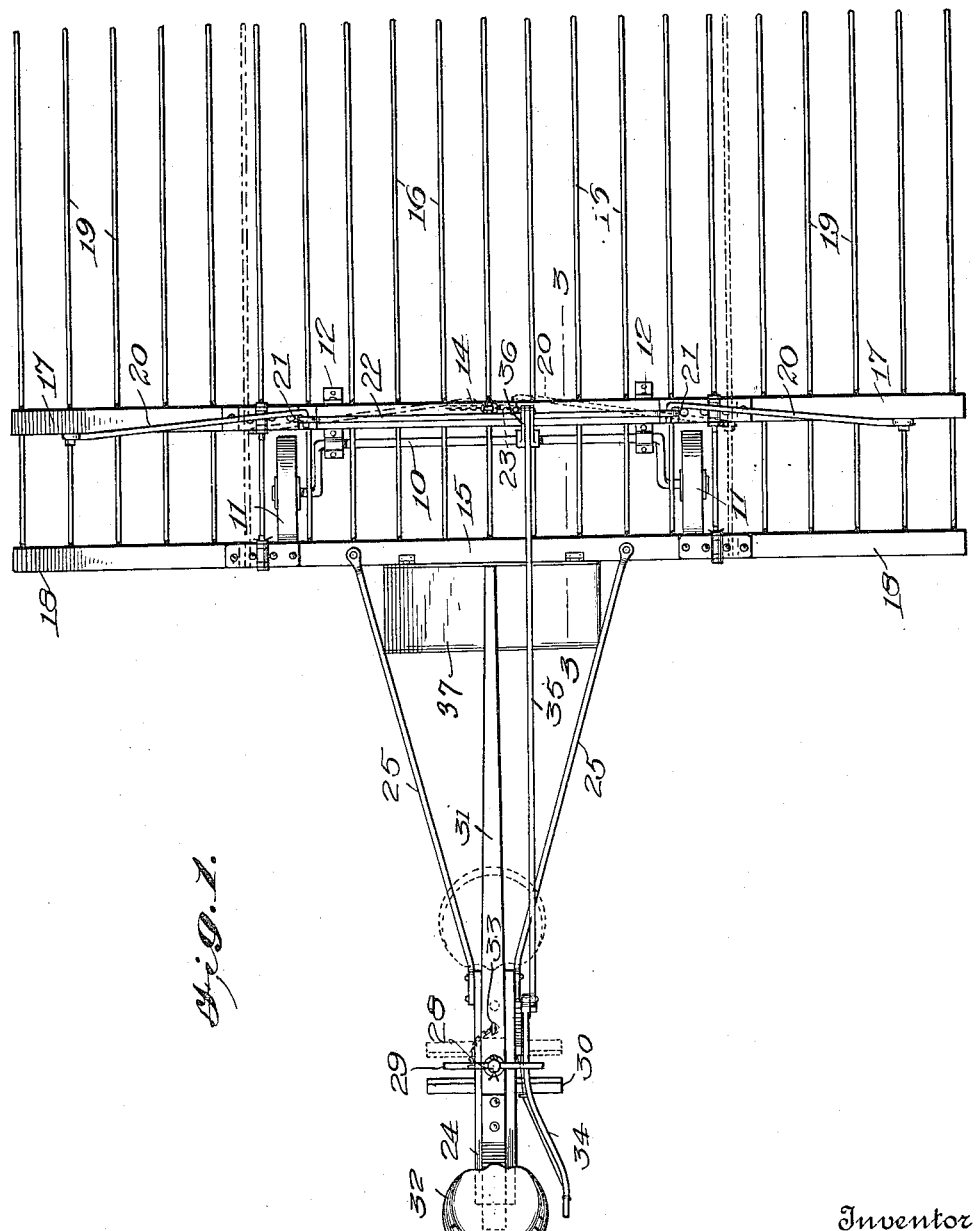

UNITED STATES PATENT OFFICE.

CHARLES J. MALLETT, OF KEMPNER, TEXAS, ASSIGNOR OF ONE-FOURTH TO FRANK C. HIGGINBOTHAM, OF HOLLAND, TEXAS, AND ONE-FOURTH TO RUSSELL H. WHIGHAM, OF KEMPNER, TEXAS.

RAKE.

1,154,790.

Specification of Letters Patent.

Patented Sept. 28, 1915.

Application filed July 7, 1914. Serial No. 849,411.

*To all whom it may concern:*

Be it known that I, CHARLES J. MALLETT, a citizen of the United States, residing at Kempner, in the county of Lampasas and State of Texas, have invented certain new and useful Improvements in Rakes, of which the following is a specification.

This invention relates to that class of hay rakes characterized by a wheeled frame having forwardly projecting rake fingers, the horses by which the rake is operated being hitched behind the rake.

It is the object of the present invention to provide in a rake of this kind a novel and improved structure which enables the rake to be folded to reduce its length when passing along a narrow road or through a gate.

The invention also has for its object to provide novel and improved means for raising and lowering the rake, and also to provide means for steering the same.

A further object of the invention is to provide a draft tongue which is reversible to enable the draft animals to be hitched to push the rake forward or to pull the same rearward.

Other objects and advantages of the invention will be pointed out in the detailed description appearing hereinafter, and in order that the invention may be better understood, reference is had to the accompanying drawings in which—

Figure 1 is a plan view of the machine; Fig. 2 is a side elevation thereof, and Fig. 3 is a cross-section on the line 3—3 of Fig. 1.

Referring specifically to the drawings, 10 denotes an arched axle having spindles at its ends on which are loosely journaled the supporting wheels 11. The arched portion of the axle carries boxings 12 which support the rake, the same comprising a frame composed of spaced front and rear cross bars 14 and 15, respectively, carrying forwardly extending fingers or tines 16. The bar 14 is mounted on the boxings. To the end of the rake is hinged a section comprising front and rear cross bars 17 and 18, respectively, carrying tines 19. The bars 17 and 18 are hinged to the bars 14 and 15 to swing in a vertical plane, which permits the end sections of the rake to be swung upward, thus reducing the length of the rake and enabling it to pass along narrow roads or through gates. The end sections carry rods 20 having hooked ends engageable with eyes 21 at the ends of a rod 22 carried by the bar 14, for holding said end sections in lowered position. The rods 20 are also employed for holding the end sections in upright position by hooking said rods into a chain 23 carried by the bar 14.

Behind the rake bar 15 is located a short beam 24 which is connected to said bar by diverging braces 25. This beam is supported by a caster-wheel 26, the latter being carried by a fork 27, the stem 28 of which passes through the beam and is free to rotate therein. Thus, the caster-wheel is swiveled and may be employed for steering the machine. The fork stem 28 rises a suitable distance above the beam 24 and has a steering arm 29, and below said beam the fork has foot rests 30 which may also be employed for shifting the caster-wheel. A draft tongue 31 is mounted on top of the beam 24, the butt end of which tongue has a vertical aperture through which the fork stem 28 loosely passes. The butt end of the tongue also carries a seat 32 for the driver. The draft tongue is pivoted on the fork stem, in view of which it may be set to point forward or rearward.

When the machine is in operation, the draft tongue is placed in the first-mentioned position, and the horses push the same forward, and in going to and from the field, the draft tongue is reversed so that the draft animals now pull the machine. A latch pin 33, passing through the tongue and seating in an aperture in the beam, is provided for locking the draft tongue. The rake is raised or lowered by swinging the arched axle 10, which is done by means of a hand lever 34 carried by the beam 24 and connected by a rod 35 to a rocker-arm 36 on said axle. The braces 25 carry a tool box 37.

I claim:

A hay rake comprising a wheeled rake frame, a support mounted behind the said frame, braces connecting the support with the rake frame, a fork having its stem swiveled in the support and rising above the same, a wheel carried by the fork, a draft tongue mounted on the support and located to the rear of the rake frame, said draft tongue having an aperture through which the upper end of the fork stem loosely passes, said draft tongue being provided with a seat standard and pivoted on the fork stem and revoluble about said stem as an axis, a seat on said standard, means to hold said tongue in directions pointing to and from the rake selectively, and pedal means at the upper end of the standard engageable when traveling in either direction by the feet of a person in said seat.

In testimony whereof I affix my signature in presence of two witnesses.

CHARLES J. MALLETT.

Witnesses:
M. M. WHITE,
V. G. BICTBOURT.

Copies of this patent may be obtained for five cents each, by addressing the "Commissioner of Patents, Washington, D. C."